United States Patent [19]
Gyenes et al.

[11] Patent Number: 5,146,150
[45] Date of Patent: Sep. 8, 1992

[54] SAFE BATTERY CELL INTERCONNECTS

[75] Inventors: Russell E. Gyenes; Raymond J. Kleinert, III, both of Sunrise, Fla.

[73] Assignee: Motorola, Inc., Schaumburg, Ill.

[21] Appl. No.: 563,581

[22] Filed: Aug. 6, 1990

[51] Int. Cl.⁵ .................. H02J 7/00; H01M 10/44
[52] U.S. Cl. ................................ 320/17; 320/2; 320/13; 429/7
[58] Field of Search ............. 320/15, 17, 18, 2, 13; 429/7, 99, 9, 62

[56] References Cited
U.S. PATENT DOCUMENTS

| | | | |
|---|---|---|---|
| 3,686,530 | 8/1972 | Bogut | 317/16 |
| 4,431,713 | 2/1984 | Fehling et al. | 429/7 |
| 4,680,527 | 7/1987 | Benenati et al. | 429/7 X |
| 4,749,934 | 6/1988 | Alexander et al. | 320/13 |
| 4,879,187 | 11/1989 | Biegger | 429/7 |

*Primary Examiner*—R. J. Hickey
*Attorney, Agent, or Firm*—Pablo Meles

[57] ABSTRACT

A battery (50) comprises a plurality of interconnected cells (56) each cell having a positive (60) and negative terminal (62) and a plurality of resistive fusible material (58) serving as interlinks interspersed between unlike terminals of the cells (56) in the plurality of interconnected cells.

11 Claims, 3 Drawing Sheets

SAFE BATTERY CELL INTERCONNECTS

TECHNICAL FIELD

This invention relates generally to battery cell interconnects, and more specifically to intrinsically safe batteries using fuses between cells.

BACKGROUND

Battery packs for portable devices such as two-way radios typically comprise a number of cells, a polyswitch (preferably a positive temperature coefficient device (PTC) made by RAYCHEM), and a current limiting device for meeting Factory Mutual Approval requirements. The current limiting device is typically a nichrome strip intended for use only as a current limiting device and not as a fuse between cells. The nichrome strip is generally designed not to open, and thus the cells are essentially unprotected from internal shorting except for the presence of a PTC.

Typical radio battery packs may have two sets of cells with a PTC and a nichrome strip between the sets. Even with the nichrome strip acting as a current limiting device to the radio contacts and the PTC serving as a temporary fuse, there still exist the danger of internal shorting between the cells within the sets. Furthermore, this arrangement is inefficient in terms of parts count and assembly time. Therefore, an improved battery pack assembly that would increase the efficiency of assembly, reduce costs, and increase the safety of the battery packs by eliminating hazards such as excessive venting and fires caused by electrical shorts would be highly desirable.

SUMMARY OF THE INVENTION

Accordingly, it is an object of the present invention to provide an improved battery comprising a number of interconnected cells where each cell has a positive and negative terminal and further comprising a number of resistive fusible links serving as interlinks interspersed between unlike terminals of the cells in the number of interconnected cells.

DETAILED DESCRIPTION OF THE PREFERRED EMBODIMENT

Figure 1:
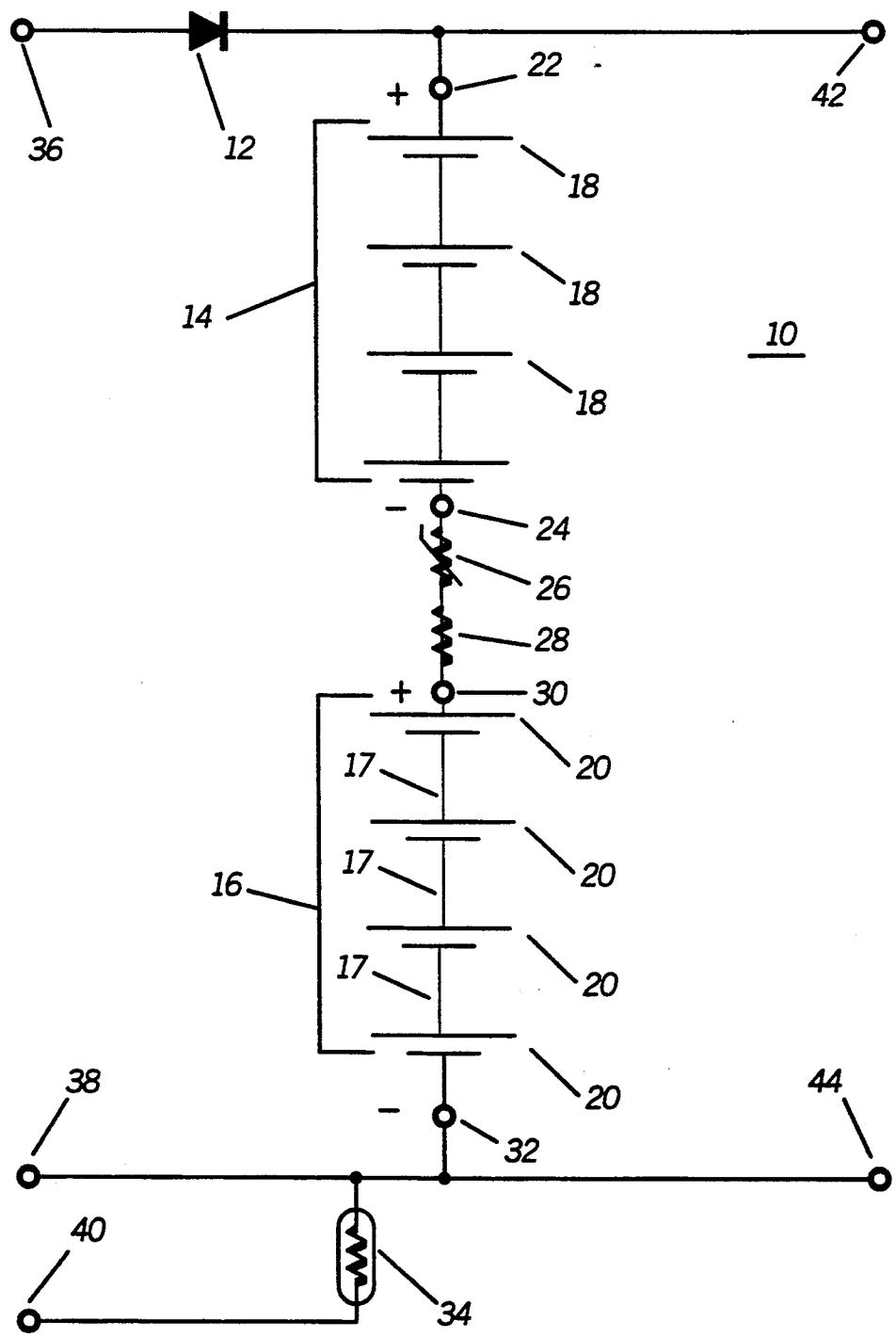
FIG. 1 is a schematic diagram of a battery circuit known in the art.

Referring to FIG. 1, there is shown a battery circuit well known in the art. In this configuration, a first group of cells 14 having four individual cells 18 are interlinked using steel tabs 17. Likewise, a second group of cells 16, having four individual cells 20 are interlinked using steel tabs 17. A diode 12, coupled to the positive charger contact 36 on one end, is biased towards the positive terminal 22 of the first group of cells 14. The diode 12 is also coupled to the positive radio contact 42. The negative terminal 24 of the first group of cells 14 is coupled to a polyswitch or a positive temperature coefficient device, preferably made by RAYCHEM. A nichrome strip 28, primarily used for current limiting is coupled between the polyswitch 26 and the positive terminal 30 of the second group of cells 16. The negative terminal 32 of the second group of cells 16 is coupled to a ground line having a charger contact 38 and a radio contact 44. The ground line is further coupled to a thermistor 34, used for determining charge rate based on temperature as is known in the art. The thermistor is coupled to thermistor contact 40.

Operationally, if the battery circuit 10 suffered an external short between radio contacts 42 and 44, the polyswitch 26 would heat up and trip to an open condition in under 3 seconds, depending on the state of the charge of the cells. The strip of nichrome 28 would carry the excess current of the short until the polyswitch 26 trips to open. Once the polyswitch 26 opens, the nichrome strip 28 would see no more current. Once the external short is removed from the battery, the polyswitch cools down and returns to its normal closed condition.

If an internal short were to occur within the battery cells (18 or 20), the battery wold be rendered non-functional. Yet, the battery remains hazardous until it cold be permanently disarmed. With the present configuration (10), the nichrome strip 28 would burn open within 10 seconds, and break the battery into two separate unprotected cell groups (14 and 16). If a short occurs, then the maximum number of cells involved after 10 seconds could 4 or more (depending on the size of the cell group) which cold easily generate sufficient heat to melt portions of the battery and cause serious safety problems. The steel tabs (17) can reach extremely high temperatures until the cells totally discharge.

Figure 2:
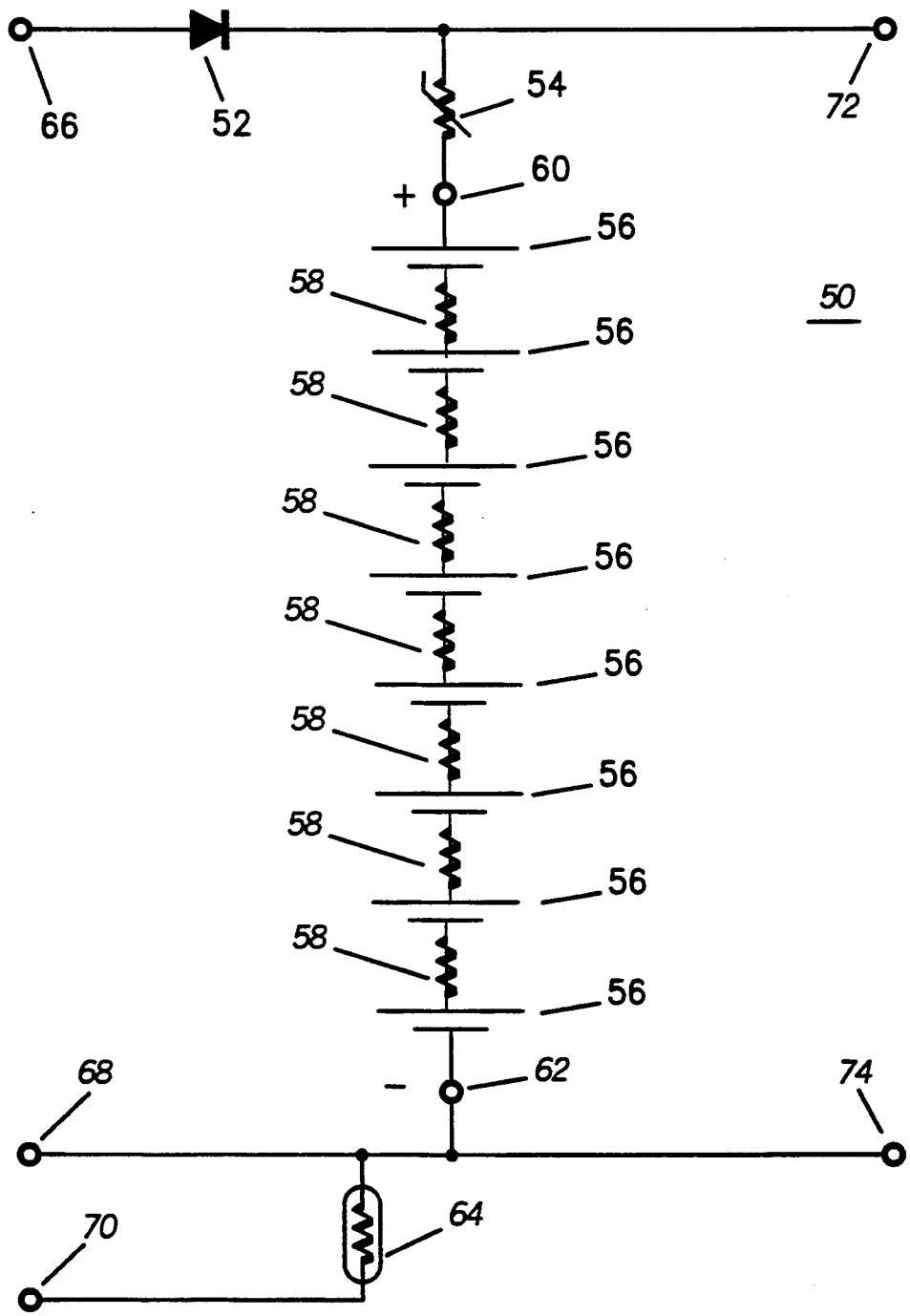
FIG. 2 is a schematic diagram of a battery in accordance with the present invention.

Referring to FIG. 2, a battery circuit in accordance with the present invention is shown. A diode 52 is coupled between the positive charger contact 66 and the positive radio contact 72. A polyswitch 54 is coupled between the diode 52 and the positive terminal (60) from a series of interconnected cells 56. In this configuration, eight cells (56) are preferably interlinked by a series of resistive fusible links, typically nichrome tabs 58. As in battery circuit 10 of FIG. 1, a thermistor 64 is preferably coupled to the negative terminal 62 from the series of cells. The negative terminal is connected to the ground line which also provide the negative charger and radio contacts. The thermistor is also coupled to the thermistor contact 70.

In the present invention, the nichrome tabs 58 replace the steel tbs of battery circuit 10, which eliminates the use of the nichrome strip. The nichrome strip 28 only served the purpose of limiting current to meet Factory Mutual Approval standards and not to serve as a fuse. The use of the nichrome tabs 58 in the present invention serves the dual purpose of limiting current and further serves to act as a fuse between the individual cells. Thus, if an internal short occurs, a nichrome tab (58) would immediately heat up and burn open within 10 seconds of the internal short. Therefore, the maximum number of cells affected in an internal short in this configuration would be 1.

Figure 3:
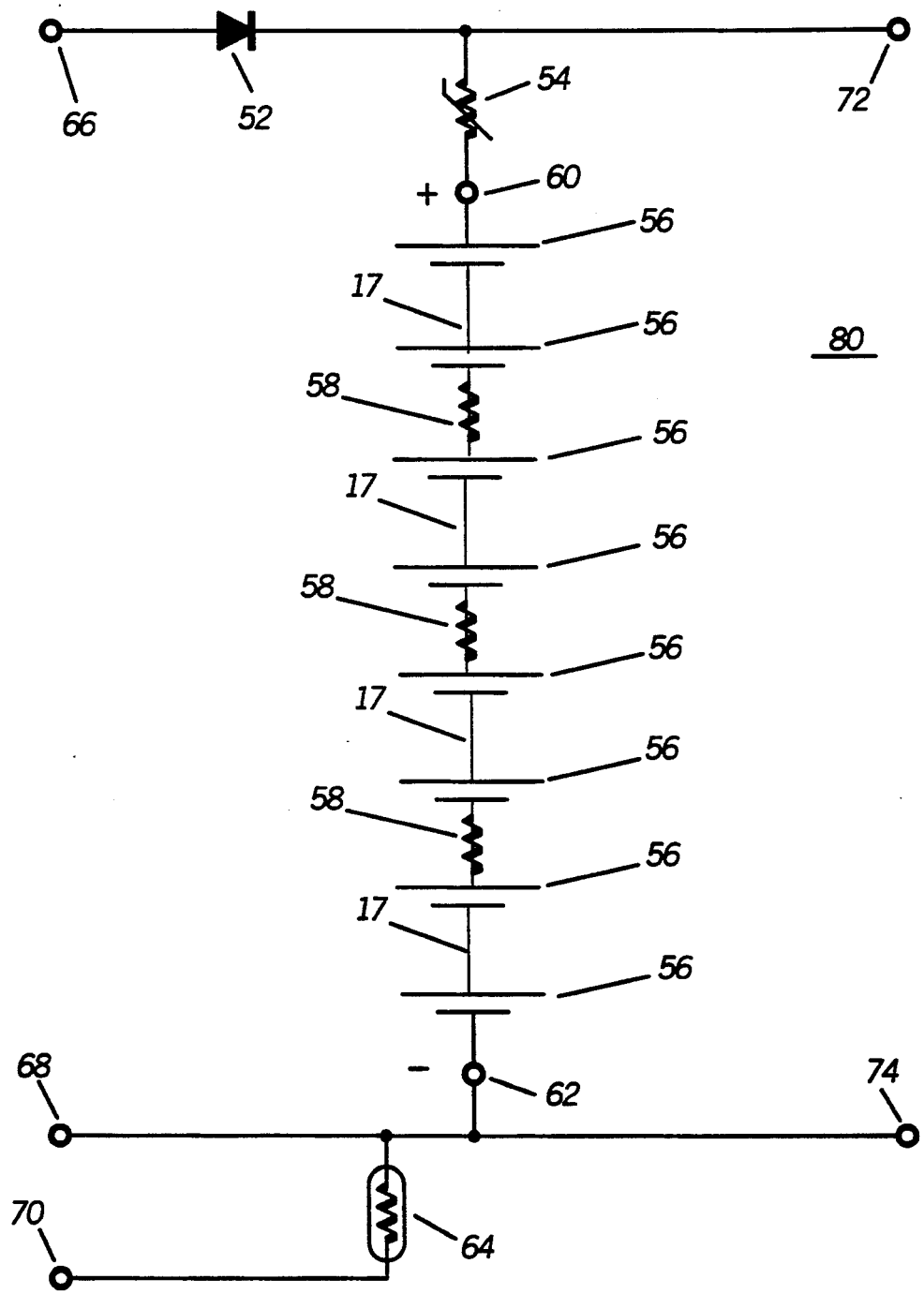
FIG. 3 is another schematic diagram of a battery in accordance with the present invention.

Likewise, in FIG. 3, a battery circuit 80, having a substantially similar configuration to that of battery circuit 50 of FIG. 2, wold have a maximum of 2 affected cells in the case of an internal short. Here, the nichrome tabs 58 are selectively interspersed between every two cells. Of course, the present invention contemplates that the nichrome tabs 58 can be selectively located in any desirable arrangement feasible to suit the particular needs and safety requirements of the battery user and manufacturer. For instance, the nichrome tabs could be arranged after every third cell.

The configuration of the present invention provides several advantages that are not quite apparent. First, the nichrome tabs 58 greatly reduces or essentially eliminates all possible hazards involved with the internal shorting of cells such as excessive venting and the potential for external fire due to the heat from the battery. The cells do not have a chance to get warm due to the quick response of the nichrome tabs to the excessive heat. Secondly, the use of the nichrome tabs 58 between the cells allows the placement of the polyswitch 54 on a flex circuit outside the string of cells (56). This arrangements allows for more efficient assembly of the battery package. Finally, the use of the nichrome tabs 58 instead of the steel tabs (17) allows for the elimination of an extra part, the nichrome strip 28. The present invention increases the Design for Assembly (DFA) efficiency of battery assemblies by removing unnecessary parts, and lowering the labor time required for final product assembly.

What is claimed is:

1. A battery comprising:
   a plurality of interconnected cells, each cell having a positive and negative terminal; and
   a plurality of resistive fusible links directly connected between the positive and negative terminals of said plurality of interconnected cells for providing interlinking current limiting, and current interrupting between cells;
   a diode coupled to one of said positive terminal of said plurality of interconnected cells; and
   a thermistor coupled to one of said negative terminal of said plurality of interconnected cells.

2. The battery of claim 1, wherein said plurality of interconnected cells are coupled in series.

3. The battery of claim 1, wherein said resistive fusible links comprise nichrome tabs.

4. The battery of claim 1, wherein the battery further comprise a positive temperature coefficient device coupled to said plurality of interconnected cells.

5. The battery of claim 1, wherein the resistive fusible links between unlike terminals of each of said cells in said plurality of cells.

6. A safety battery having a positive and a negative terminal, a polyswitch and a plurality of cells in series coupled to said polyswitch, comprising:
   a resistive fusible link coupled between each cell in said plurality of cells for providing a current limiter and a fuse;
   a diode coupled to said positive terminal of said safety battery circuit;
   a thermistor coupled to said negative terminal of said safety battery circuit.

7. The safety battery circuit of claim 6, wherein said resistive fusible material between each cell comprise nichrome tabs.

8. A safety battery circuit for use in a portable radio, comprising:
   a plurality of cells, each having a positive and negative terminal;
   a plurality of resistive fusible link for directly connecting unlike terminals among said cells in said plurality of cells;
   a positive temperature coefficient device coupled to a positive terminal of the plurality of cells;
   a diode coupled to said positive temperature coefficient device.
   a thermistor coupled to a negative terminal of the plurality of cells.

9. The battery circuit of claim 8, wherein the resistively fusible links are interspersed among said cells in said plurality of cells.

10. The battery circuit of claim 8, wherein the resistively fusible links are coupled between every other cell in said plurality of cells.

11. The battery circuit of claim 8, wherein the resistively fusible links are coupled between each cell in said plurality of cells.

* * * * *